May 26, 1970          H. EGGER          3,513,827

PROCESS AND COMBUSTIBLE BODY FOR HEATING AND/OR IGNITING OBJECTS

Filed Oct. 12, 1967          2 Sheets-Sheet 1

INVENTOR: HANNS EGGER

By *Joseph Hirschma*

ATTORNEY

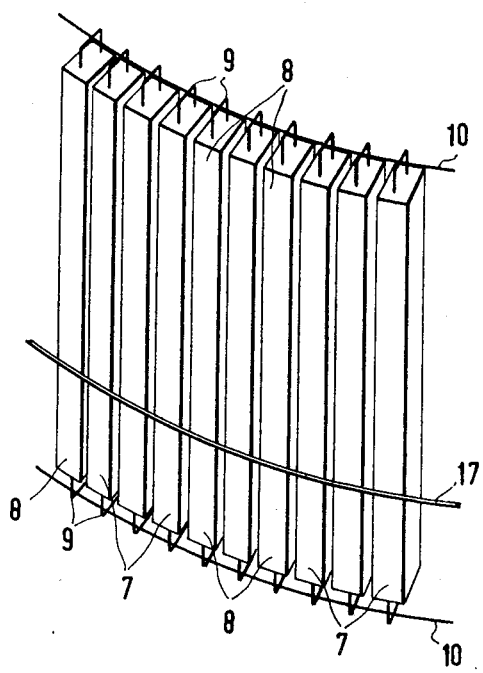
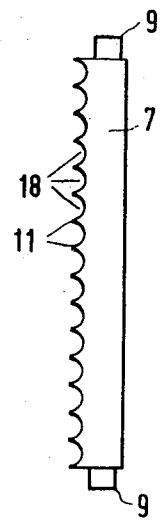
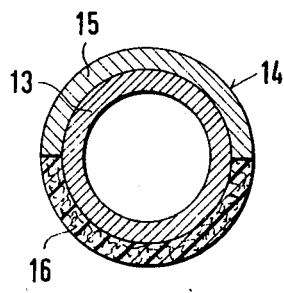
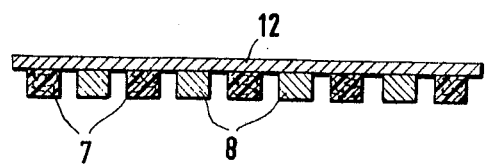

United States Patent Office 3,513,827
Patented May 26, 1970

3,513,827
PROCESS AND COMBUSTIBLE BODY FOR HEATING AND/OR IGNITING OBJECTS
Hanns Egger, Haus Nr. 44, Hagen, Murnau, Germany
Continuation-in-part of application Ser. No. 539,347, Apr. 1, 1966. This application Oct. 12, 1967, Ser. No. 674,776
Claims priority, application Germany, Apr. 3, 1965, E 29,032
Int. Cl. A47g 23/04
U.S. Cl. 126—262
14 Claims

ABSTRACT OF THE DISCLOSURE

Means for rapidly heating various objects, like machines, instruments, cans containing food, containers filled with fat or oil, or for igniting explosives, comprising a combustible carrier, preferably in the form of an organic foam, impregnated or coated with a high energy self-combustion-sustaining combustible fuel mixture, or with two such fuels of different rates of combustion. Said means can be in the form of ropes, spaced rods alternating with non-combustible rods, or continuous mats and cylinders provided with spaced projections or protuberances on their sides facing the object to be heated, and spacing the main body of the carrier from such object.

---

The present application is a continuation-in-part of my copending application, Ser. No. 539,347, filed Apr. 1, 1966, now abandoned.

The present invention relates to a process and a combustible body for heating and/or igniting objects, especially machines, instruments, cans containing food ready or use, containers holding fat, oil or explosives, etc., by using a self-burnable, preferably porous, absorbent carrier in combination with a self-combustion-sustaining combustible mixture of a fuel and an oxidizing agent that burns quickly and produces a relatively large amount of heat.

It is the general object of the invention to improve this method of heating, and the combustible carrier, in such a way as to transmit the heat generated by the ignited combustible mixture to the object to be heated and/or ignited as quickly and effectively as possible, and in particular to prevent the water vapor produced by the combustion from affecting the generation and transmission of heat, especially during the heating of cold objects.

According to the invention, this object is achieved by saturating or coating the carrier with one or more combustible mixtures and placing it at a short distance from the object to be heated or ignited; the fuel carrier may also be wrapped around or pulled over the object.

By leaving a small space between the carrier and the object to be heated, it is insured that any possible moisture produced by the combustion will escape from the object and that the combustible mixture and its carrier will thus be kept free of moisture, so that the heat transfer to the object to be heated and/or ignited will not be hindered, and extinguishing of the burning mixture will be prevented.

The inventive process is suitably carried out by using a combustible mixture whose carrier is equipped with projections in the form of wart-like proturberances, burls, ribs or the like, which abut against the surface of the object to be heated. The ribs may be formed by grooves extending directly adjacent to each other. The combustible carrier is preferably made of foamed plastic material or a similar porous, absorbent foamed material which is coated or saturated with the self-combustion sustaining combustible mixture. It may exhibit the form of a plate, strip or mat, but may also be composed of a multiplicity of small parallel rods, one or all of which consist of a porous material saturated with the mixture, the rods being preferably interconnected at their ends by a piece of wire.

It is possible to use the small, combustible mixture saturated rods in an alternating arrangement with rod-like intermediate members which consists of non-combustible material or are enveloped by a non-combustible insulating layer covering their surfaces with the exception of the sides abutting against the object to be heated and/or ignited. The small, combustible rods may consist of combustible plastic foam, other foamed material or paperboard, coated or saturated with the combustible mixture.

With reference to the appended drawings, several suitable embodiments of the combustible carrier body intended to be used in connection with the method of the invention will be described hereinafter:

FIG. 4 illustrates another embodiment of the combustible carrier body in the form of small parallel rods;

FIG. 5 is a side view of one of the rods;

FIG. 6 is a view from the narrow side of a still further embodiment, in which the rods are interconnected by means of a paperboard strip;

FIG. 7 is a front view of still another embodiment of the combustible carrier body in tubular form suitable for pulling over or wrapping around an object to be heated or ignited which is also tubular or cylindrical in shape.

Figure 1:
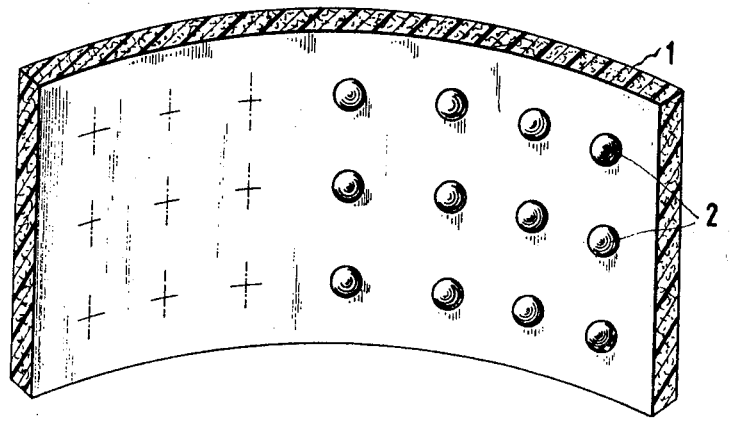
FIG. 1 is a three-quarter view of an embodiment in the form of a flexible mat made of plastic foam.
Figure 2:
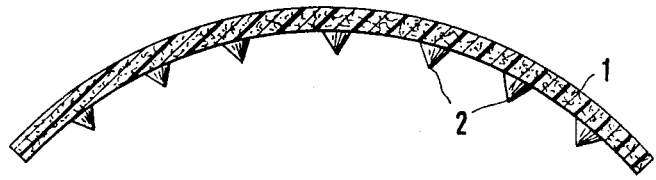
FIG. 2 shows the embodiment of FIG. 1, as seen from one of the narrow sides.

In the embodiment of FIGS. 1 and 2, the carrier consists of combustible plastic foam or a similar porous, absorbent foamed material, coated or saturated with the combustible mixture. Due to its flexibility, this material may be put or wrapped around the object to be heated or ignited, or it may be applied to the plane sides of an object. The side of the carrier that is intended to abut against the surface of the object to be heated or ignited is provided with wart-like projections 2 of the same or a different material, the tips of which abut against the surface of the object. This construction insures a free space between the carrier and the object to be heated in the areas between the projections 2. This space serves for the escape of the water vapor that may be produced by the combustion during the heating or igniting of the object being heated.

Figure 3:
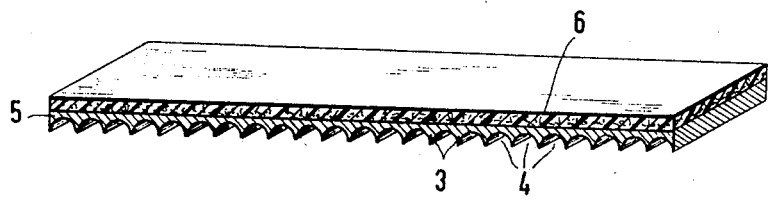
FIG. 3 is a three-quarter view of a further embodiment of the combustible carrier body in the form of a two-layer mat.

FIG. 3 shows a carrier consisting of a paperboard layer 5 intended to abut against the object to be heated and/or ignited, and a second layer 6 of plastic foam or a similar material that faces away from the object, when the latter is fitted with the carrier. Both layers are coated or saturated with the combustible mixture. The paperboard layer 5 is provided with linear projections 3 which abut against the object to be heated or ignited. These linear projections 3 are formed by the ridges between the spaced grooves 4 provided in the paperboard layer 5 and extending over the entire width of the fuel carrier directly adjacent to each other. These grooves are also exceptionally effective in enabling the escape of any moisture that may be produced during the combustion process.

In the embodiment of FIGS. 4 and 5, the fuel carrier is formed of a number of small rods 7 disposed adjacent to but slightly spaced from each other. These rods 7 consist of a material, e.g., combustible plastic foam, paperboard or the like, that is saturated or coated with the combustible mixture, and alternate with rod-like intermediate bodies 8 consisting of non-combustible material. Eyelets 9 are provided in both ends of each of these small rods 7 which accommodate a connecting wire 10 that holds the rods together. Due to this construction consisting of separate rods, the combustible carrier retains a high degree of flexibility, even when it is made very thick for the purpose of generating and transmitting a large amount of heat. The rod-like, non-combustible intermediate bodies serve to absorb and store the heat given off by the ignited combustible rods 7 or by the object heated and/or ignited by them, in order to transmit it to the object when the latter starts to cool off. In this way, the object to be heated may be kept warm for a considerable length of time.

The non-combustible, rod-like intermediate bodies 8 may be made of unsaturated, non-combustible plastic foam or glass wool. In addition, they may also be enveloped by a non-combustible insulating layer, e.g., an aluminium foil layer, except for the sides abutting against the object to be heated or ignited. Since they do not burn, they may be combined with new, combustible rods and used again subsequently to the burning up of the combustible rods.

In the embodiment of FIG. 5, the combustible rods 7 are provided with grooves 18 extending adjacent to each other and disposed on the side of the rods that abuts against the object to be heated or ignited. The grooves 18 alternate with rib-like projections 11, with which the small rods abut against the object. The grooves may extend parallel or transversely to the longitudinal direction of the rods. The grooves provide for the quick discharge of the moisture that may be produced during the heating process. The projections may also be formed as wart-like protuberances instead of grooves.

FIG. 6 shows an embodiment having a carrier that consists of a number of combustible rods 7 alternating with non-combustible or insulated intermediate rods 8. In this case, however, the rods are not lined up on two wires 10, but are glued onto one or several strips or ribbons 12 consisting of non-combustible material. Here, the combustible rods may also be equipped with grooves or wart-like projections on their object-abutting sides.

The combustible bodies shown in FIGS. 4–6, as well as those shown in FIGS. 1–3, may be cut to the size and shape of the object to be heated and/or ignited. These combustible bodies may, for instance, be cut out of or cut off from a large mat or baled web; except for the embodiment according to FIGS. 4 and 5, the side edges of the mat may also be cut.

Subsequently to the combustion of the combustible rods, the embodiments according to FIGS. 4–6 may be displaced on the object to be heated in such a way as to place the non-combustible rods on the spots that had first been occupied by the combustible rods in order to distribute and store the high amount of heat generated in these spots more effectively. The plastic material of the non-combustible rods is capable of retaining heat stored for several hours and of transmitting it to the object to be heated.

The combustible bodies of the embodiments shown in FIGS. 1–6 may either be placed in a plane surface against the object to be heated and/or ignited or suitably wrapped around the latter. Non-combustible wire or a fuse cord 17 (FIG. 4) reinforced with non-combustible wire may, for instance, serve to secure the combustible body to the object, the fuse simultaneously serving as a means for igniting the combustible body.

The combustible body shown in FIG. 7 serves above all to heat and/or ignite, e.g., horizontally extending pipes, hollow bodies, containers and the like. It represents a tube 14 with a cross-section dimensioned so that it can be pushed on to the object to be heated in direct contact therewith. The tube is composed of two sections 15, 16 of semicircular cross-section, the upper section of which consists of paperboard saturated with fuel and is intended to cover the upper half of the object 13 to be heated, while the sector 16 covering the underside of self-combustion-sustaining the object 13 consists of combustible fuel-saturated plastic foam or a similar, porous foamed material. The upper, paperboard section 15 of the fuel body burns without residue, whereas the lower one does leave a certain amount of residue, which, however, drops down from the lower half of the tubular object 13. Besides, the plastic foam offers the advantage of an increased generation of heat, which is especially effective in the lower areas of the tube. This combustible body is suited especially for heating gun barrels and other gun parts, e.g. breeches.

The combustible body as illustrated in FIG. 7 may, however, also consist of a mat wrapped around the object. As in the embodiments according to FIGS. 1–6, the interior abutting surface of the combustable body according to the embodiment of FIG. 7 may also be conveniently provided with projections in the form of wart-like protuberances, burls, ribs or the like, in order to make possible a quick discharge of the water vapor that may develop by the combustion in the spaces defined by the protuberances, burls or ribs.

If the combustible body is to be used for heating the contents of a can and is to be wrapped around or pulled over the latter in the canning factory, it should be dimensioned so that it will not extend over the entire height of the can, but will end at a short distance from the bottom and the top of the can, respectively. In this way, the combustible body is protected from damage when handled without care. For protection, the combustible body may also conveniently be welded into a plastic foil, with which it is wrapped around the can. This plastic foil may at the same time serve for wrapping of the combustible body before its use.

The combustible carrier, e.g., the fuel mixture carrier 1 or the combustible rods 7 should be of a plastic foam combusting substantially without smoke residue, preferably polyurethane foam with open cells for the impregnation with the combustible mixture. If cardboard is used as combustible carrier, it should possibly be porous.

The fuel, i.e., the combustible mixture, can be absorbed in the cells or pores respectively and in the material itself.

Fuels, i.e., conbustible mixtures, which may be used in or on the carrier are those which do not volatilize at normal temperature and are not self-inflammable. Solid fuels and liquid dispersions or solutions of solid fuels, mixed with an oxidizing agent, may be used, the dispersion medium or the solvent being evaporated after impregnating the carrier with the mixture. In addition, the fuel mixtures should generate a relatively great heat of combustion and should be inflammable easily, so that the combustible body may be ignited by a burning cigarette or a match.

Especially suitable fuels are, e.g., mixtures of magnesium powder and potassium nitrate, of magnesium powder and potassium chlorate (e.g., 10 parts to 12 parts) and of magnesium powder and thorium nitrate (e.g., 2 parts to 1 part). Fuels decomposing or attacking the carrier material are to be avoided. In addition, they should not have poisonous properties or effects injurious to health if the combustible body is used for heating foodstuffs.

The fuel mixtures may be incorporated in the ready foam which may be accomplished in the case of dispersions or solutions of the fuels by impregnating the carrier with the mixture followed by evaporating the dispersion medium or the solvent. In order to do this, the foam can be first subjected, for example, by pressing to vacuum and the liquid mixture of the fuel then caused to flow into it. It is also possible to incorporate the fuel mixture in the plastic foam during the production of the latter, i.e., during blowing. Solid powdered fuel mixtures may be impressed into the carrier or dispersed in water or another volatile liquid and the carrier may be impregnated with this liquid.

The invention is not only convenient for heating lubricants such as oils or fats in machines, devices, etc., and for rapid heating of canned foods, but for any objects to be heated in a short period. For example, the invention may be used to convert any materials from the solid or substantially solid state to the liquid or substantially liquid state or for military application, e.g., when the lubricants or guns are so viscous in winter that they are not usable. Canned foods may be heated within a few seconds. The invention may be used in any case where a rapid heating of an object is desired.

I claim:

1. Heating element for heating or igniting objects comprising a combustible plastic foam having incorporated therein a self-combustion-sustaining combustible composition, said carrier being further equipped with projections adapted to abut against the surface of the object to keep the main body of the carrier spaced therefrom, and said carrier being composed of a number of interconnected rods extending parallel to each other, at least certain of said rods consisting of a porous material saturated with the combustible composition.

2. Heating element according to claim 1, wherein the rods are interconnected at their ends by wire.

3. Heating element according to claim 1, wherein the rods are secured to an interconnecting paper layer.

4. Heating element according to claim 1, wherein the rods saturated with the combustible composition, consist of combustible plastic foam.

5. Heating element according to claim 1, wherein combustible composition-saturated rods alternate with rodlike intermediate bodies consisting of noncombustible material.

6. Heating element according to claim 1, wherein combusitible composition-saturated rods are surrounded by a noncombustible insulating layer, except for the sides abutting against the object to be heated.

7. Heating element according to claim 5, wherein the noncombustible intermediate bodies consist of a member of the class consisting of non-combustible plastic foam and glass wool.

8. Heating element according to claim 1, wherein the combustible rods consist of a member of the class consisting of combustible plastic foam and paperboard.

9. Heating element according to claim 1, wherein the rods are provided with projections in the form of warts, burls or ribs on sides abutting against the object to be heated or ignited.

10. Heating element for heating or igniting objects comprising a combustible plastic foam carrier having incorporated therein a self-combustion-sustaining combustible composition, said carrier being further equipped with projections adapted to abut against the surface of the object to keep the main body of the carrier spaced therefrom, said carrier comprising a rollable mat composed of a paperboard layer and a second layer positioned to abut against the object to be heated and consisting of a fuel mixture-saturated plastic foam.

11. Heating element for heating or igniting objects comprising a combustible plastic foam carrier having incorporated therein a self-combustion-sustaining combustible composition, said carrier being further equipped with projections adapted to abut against the surface of the object to keep the main body of the carrier spaced therefrom, said heating element being for heating tubular or cylindrical objects with a substantially horizontal axis, said carrier being formed as a tube of a diameter such that it can be pulled over the object to be heated or ignited in direct contact therewith, said carrier tube being composed of two semi-cylindrical sections, one of which consists of a fuel-saturated, combustible plastic foam, while the other consists of fuel-saturated paperboard.

12. Heating element for heating or igniting objects comprising a combustible plastic foam carrier having incorporated therein a self-combustion-sustaining combustible composition, said carrier being made of a polyurethane foam.

13. Heating element according to claim 12, wherein the combustible composition comprises a mixture of a fuel and an oxidizing agent selected from the group consisting of potassium chlorate and thorium nitrate.

14. Heating element for heating or igniting objects comprising a combustible plastic foam carrier having incorporated therein a self-combustion-sustaining combustible composition including powdered magnesium.

References Cited

UNITED STATES PATENTS

| | | | |
|---|---|---|---|
| 2,374,696 | 5/1945 | Naranick | 126—262 |
| 2,606,547 | 8/1952 | Stofel | 126—262 |
| 3,120,226 | 2/1964 | Akin | 126—262 |
| 3,261,347 | 7/1966 | Sherman | 126—263 |
| 3,311,459 | 3/1967 | Francis et al. | 126—263 |

CHARLES J. MYHRE, Primary Examiner